United States Patent [19]
Lonbardo

[11] Patent Number: 5,641,085
[45] Date of Patent: Jun. 24, 1997

[54] PRESSURIZED CONTAINER SAFETY DEVICE COMPRISING A SEALING HAVING A WEAKENED SECTION

[75] Inventor: Antoine Lonbardo, Is sur Tille, France

[73] Assignee: SEB S.A., Selongey, France

[21] Appl. No.: 451,253

[22] Filed: May 26, 1995

[30] Foreign Application Priority Data

May 27, 1994 [FR] France ................... 94 06727

[51] Int. Cl.$^6$ ............. B65D 51/16; B65D 53/02
[52] U.S. Cl. ............. 224/203.12; 220/378; 220/240; 277/206 R; 215/270
[58] Field of Search ............. 220/203.11, 203.12, 220/378, 240; 215/270, 352, 341; 277/206 R, 9

[56] References Cited

U.S. PATENT DOCUMENTS

| 2,600,703 | 6/1952 | Strom . |
| 2,600,714 | 6/1952 | Wenscott et al. . |
| 4,276,990 | 7/1981 | Chiodo . |
| 4,592,479 | 6/1986 | Resende ............... 220/203.12 |
| 4,685,587 | 8/1987 | Sebillotte . |

FOREIGN PATENT DOCUMENTS

| 0210914 | 11/1988 | European Pat. Off. . |
| 1421925 | 11/1965 | France . |
| 404908 | 7/1966 | Switzerland . |
| 571335 | 11/1975 | Switzerland . |

Primary Examiner—Allan N. Shoap
Assistant Examiner—Nathan Newhouse
Attorney, Agent, or Firm—Loeb & Loeb LLP

[57] ABSTRACT

A safety device for automatically limiting the pressure in a container, which container is composed of a pot and a lid. The device is constituted by a seal member interposed between the pot and the lid to form a seal between the pot and the lid, the seal member having an annular form with an interior surface and an exterior surface and being provided with a recess in the exterior surface along a portion of its length. The recess creates a reduced cross section of the seal member for permitting a deformation of the portion under the action of pressure in the container, starting from a predetermined pressure value, to assure a break in the seal between the pot and the lid and depressurization of the container. The weakened cross section is formed by a combination of the recess in the exterior surface and at least one recess in the interior surface of the seal member.

18 Claims, 2 Drawing Sheets 5,641,085

PRESSURIZED CONTAINER SAFETY DEVICE COMPRISING A SEALING HAVING A WEAKENED SECTION

BACKGROUND OF THE INVENTION

The present invention relates to the general technical field of appliances for steam cooking, such as pressure cookers for example, in which a lid is locked to a pot in a sealed manner by the intermediary of a peripheral sealing joint.

The present invention concerns more particularly an automatic pressure limiting safety device for a container, such as a pressure cooker, the safety device comprising a sealing joint interposed between the pot and lid of the container, the joint having at least one length portion which presents an external clearance forming a weakened transverse cross section to permit a deformation of the joint in that portion under the action of the internal operating pressure, starting from a predetermined value of the pressure, to assure a gap in the seal and thus depressurization of the container.

The present invention equally concerns a pressurized container, and in particularly a pressure cooker, equipped with a safety device according to the invention.

In containers for steam cooking in a closed atmosphere, such as pressure cookers, it is necessary to provide a safety device capable of assuring, in case of a malfunction of the main pressure control system, an escape of steam upon attainment of a pre-established pressure corresponding to an assigned pressure.

It is already known in devices according to the prior art to install a sealing joint, or seal, under compression between the pot and the lid of a container. Such a joint assures, when the lid is locked, for example by a closing device of the bayonet-type, a complete seal for the container. In case of an excessively high pressure and simultaneously a failure of the main pressure regulating system, a break in the integrity of the sealing joint is assured by a radial and localized deformation of the joint in a space formed by a groove or recess formed in the edge or the peripheral skirt of the lid. Deformation of the joint into this space permits an interruption of the sealing effect between the upper edge of the pot and the joint itself, which permits vapor to escape. Such systems are described, for example, in U.S. Pat. No. 2,600,703 and Swiss Pat. No. 407,459.

Other known safety systems for assuring automatic depressurization of a container under pressure are described in U.S. Pat. No. 4,276,990 and British Pat. No. 2,208,131. These systems provide for the interposition of a sealing joint between the pot of a container and its lid. They include, in addition, an extrusion opening arranged in the lid, in particular in its peripheral skirt.

In case of an excessive pressure, or over pressure, the joint can be extruded through the opening of the lid in a manner to permit steam to leak toward the bottom along the side of the pot. Extrusion of the joint through the opening of the lid can be aided by providing an internal clearance in the joint, such as described, for example, in Swiss Pat. No. 571,335.

Such a system can be improved by providing, substantially in front of the extrusion opening, a creep hole that extends through the lid. In such a case, during extrusion of the joint through the lateral opening of the lid, steam can escape via the lid, because the joint then uncovers the creep hole. This improvement prevents escape of the vapor toward the bottom, which could have as its effect to extinguish the heating source when the latter is constituted by gas.

Other known arrangements include, as disclosed for example in U.S. Pat. No. 2,600,714, depressurization safety devices comprising an annular joint presenting a clearance in its external face. Such a joint is mounted on a pressure cooker between the lid and the pot. It presents a weakened transverse section and is deformed at the level of the external clearance in the case of an excessive pressure in order to create a break in the seal.

The totality of automatic depressurization safety devices described above fulfill, in a generally satisfactory manner, their assigned safety function. They have been found, however, to present a certain number of drawbacks including, among the most significant, the necessity for a specific design for the lid. The lid must, in effect, have an outline adapted in a localized manner to permit the joint itself to deform locally either in grooves, or through extrusion openings. Such arrangements of the outline of the lid introduce extra steps in the industrial fabrication process and render that process more complex to the extent that additional constraints and tolerances are introduced. The overall cost of these arrangements is moreover not negligible, which finally results in a general increase in the final cost of the product. Moreover, the known joints are often extruded between sides and the liberation of steam is effectuated abruptly, rather than progressively, entailing risks of spraying and of extinction of the cooking fire.

SUMMARY OF THE INVENTION

An object of the invention is to overcome the various difficulties and drawbacks noted above and to provide a safety device which is simplified and less expensive, not adversely affecting the reliability of its utilization and operation, while permitting a weak and progressive escape of steam.

Another object of the invention is to provide a safety device permitting accurate selection of the pressure level which triggers operation of the safety device.

The above and other objects are achieved, according to the present invention, by a safety device for automatically limiting the pressure in a container, which container is composed of a pot and a lid, the device comprising a seal member interposed between the pots and the lid to form a seal between the pot and the lid, the seal member having a length, an interior surface and an exterior surface and being provided with a recess in the exterior surface along a portion of the length, the recess creating a reduced cross section of the seal member for permitting a deformation of the portion under the action of pressure in the container, starting from a predetermined pressure value, to assure a break in the seal between the pot and the lid and depressurization of the container, wherein the weakened cross section is formed by a combination of the recess in the exterior surface and at least one recess in the interior surface.

Other particularities and advantages of the invention will become more readily apparent from the reading of the following description, with reference to the attached drawings, which show exemplary and non-limiting embodiments of the invention.

DESCRIPTION OF THE PREFERRED EMBODIMENTS

In the description which follows, the container within which a pressure is to be established and on which a safety device according to the invention is installed is a pressure cooker. However, it should be understood that the invention can be applied to any other type of cooking apparatus in which a closed atmosphere is created and in which a lid is connected to a pot in a manner such that an air-tight seal is formed.

Figure 2:
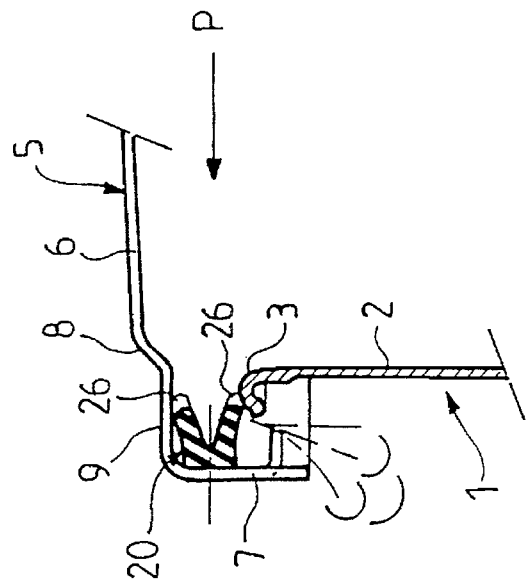
FIG. 2 is a view similar to that of FIG. 1 showing the seal member in a pressure release position.
Figure 1:
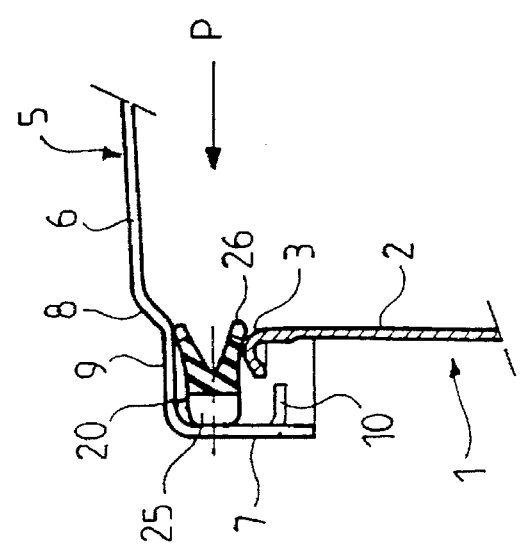
FIG. 1 is a cross-sectional detail view showing a part of a pressure container having a safety device composed of a seal member according to the invention in its sealing position.

The pressure cooker shown in a schematic manner in FIGS. 1 and 2 includes a metal pot 1 made of any appropriate material, for example stainless steel, aluminum, or enameled steel, pot 1 being of any desired form, and for example rectangular or preferably circular. Pot 1 has a bottom (not shown in the Figures) and a lateral envelope delimited by a wall 2 which is substantially vertical and the upper extremity of which forms an edge, or rim, 3 which in this embodiment is folded over toward the exterior of pot 1. The apparatus according to the invention also includes a lid 5 having a central body 6 in the form of a disk, body 6 being terminated by a peripheral skirt 7 extending at a distance from, and substantially parallel to, wall 2 when lid 5 is installed on pot 1. Advantageously, lid 5 has a shoulder 8 forming an annular belt 9 between the periphery of central body 6 and peripheral skirt 7.

In a manner known per se, lid 5 can be locked onto pot 1 with the aid of conventional locking means, which can include ramps 10 constituting bayonet locking means acting in association with abutment surfaces fixed to pot 1, or with the aid of other locking means of the locking jaw type, for example.

Figure 4:
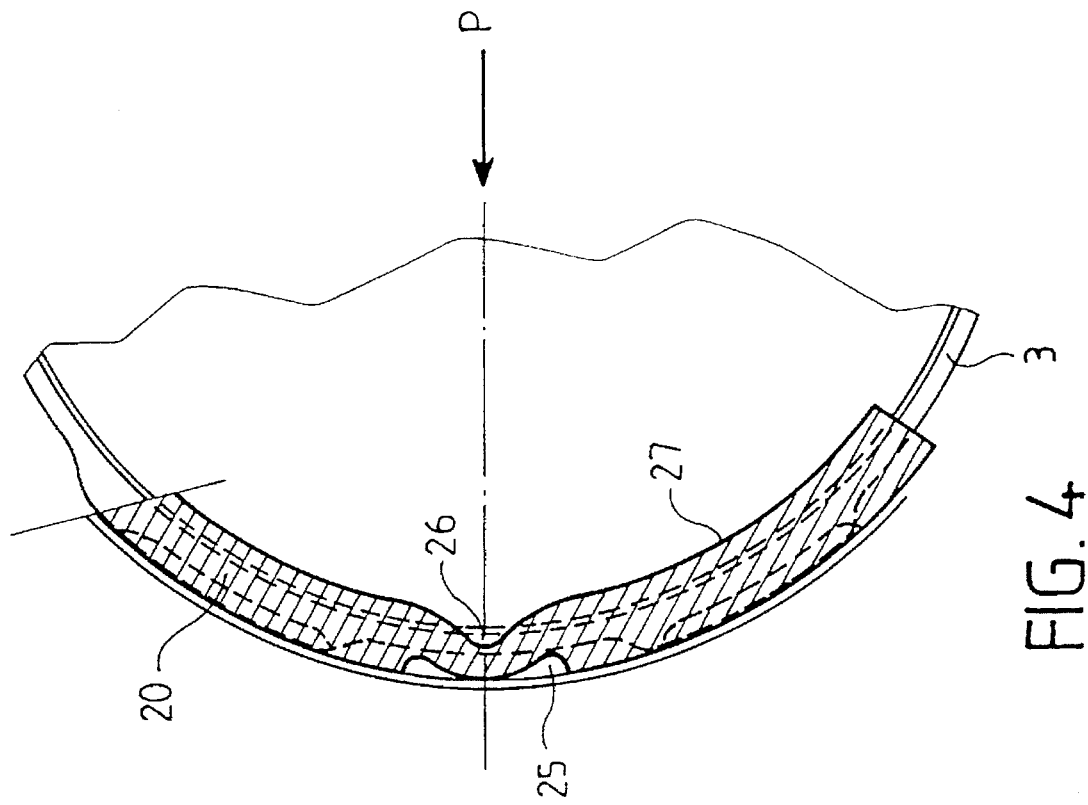
FIG. 4 is a view similar to that of FIG. 3 showing the seal member in the position of FIG. 2.
Figure 3:
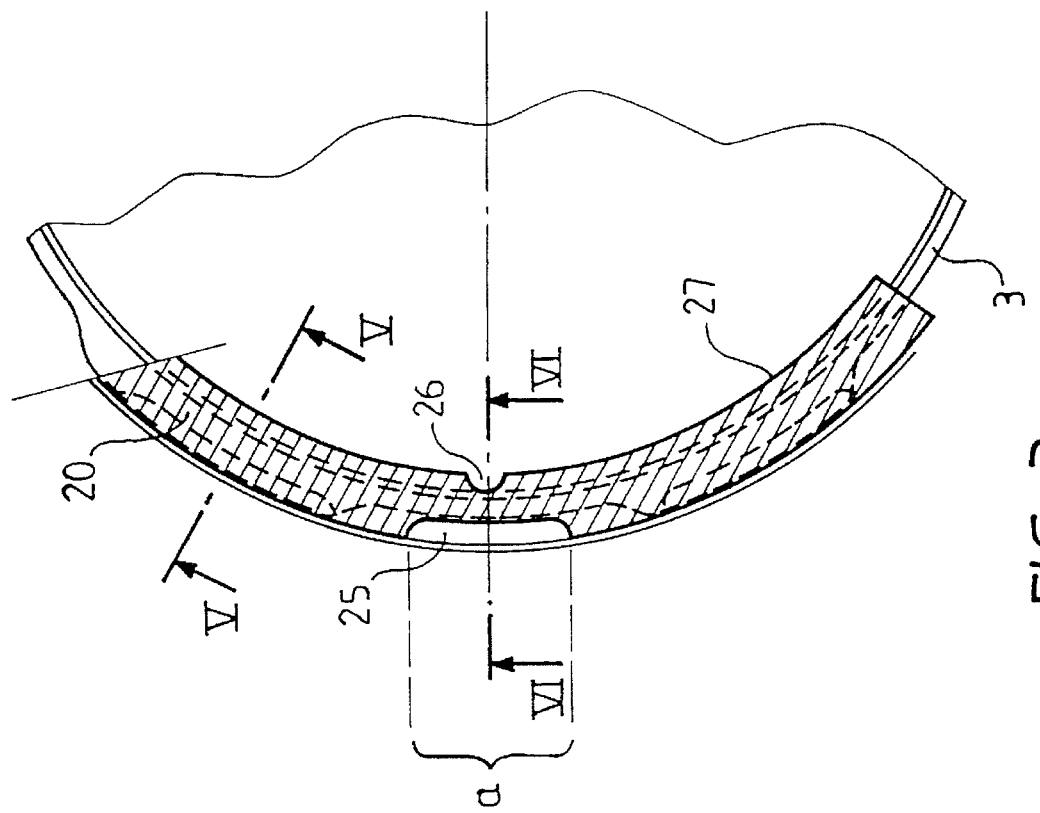
FIG. 3 is a cross-sectional detail plan view showing a portion of the safety device of FIGS. 1 and 2, with the seal member in the position shown in FIG. 1.

The safety device according to the invention also includes a seal member, or sealing joint, 20 interposed between pot 1 and lid 5. Advantageously, member 20 is mounted in compression in the space formed by annular belt 9, peripheral skirt 7 and edge 3 in order to form a peripheral joint having a form identical to that of the container. In the example shown in FIGS. 1–6, member 20 is annular and circular. FIGS. 3 and 4 show only a limited portion of the circumference of member 20.

Figure 6:
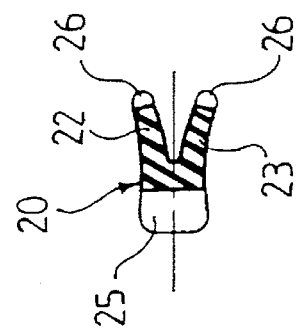
FIGS. 5 and 6 are cross-sectional views taken along the lines V—V and VI—VI, respectively, of FIG. 3.
Figure 5:
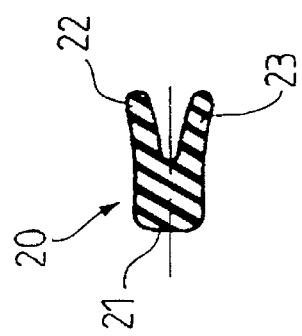

According to a preferred embodiment of the invention, seal member 20 is of the type having lips and thus has, as shown particularly in FIGS. 5 and 6, a cross section generally comparable to a U and seal member 20 is composed of a head 21 which corresponds to the base of the U and an upper lip 22 and a lower lip 23 which correspond to respective legs of the U.

According to an essential characteristic of the invention, seal member 20 includes, as shown particularly in FIGS. 3, 4 and 6, at least one length, or circumference, portion, a, having a cross section with an area which is smaller than the area of the average cross section of seal member 20, i.e. the cross section in the plane of FIG. 6 is smaller than the cross section in the plane of FIG. 5.

The localized reduction of the cross section of seal member 20 along a length portion a permits the creation of a weakening of seal member 20 along length portion a, allowing a deformation of seal member 20 radially outwardly in the region of portion a under the action of pressure (P) existing between lips 22 and 23.

According to preferred embodiments of the invention, the cross section of seal member 20 along length portion a provides a weakening in the radial direction along the center of symmetry of seal member 20. According to one form of construction, the weakened cross section is formed as shown in FIGS. 3 and 6 by a recess 25 formed at the external periphery of seal member 20, within the body of head 21. According to the practical embodiment shown in FIG. 3, external recess 25 extends around the totality of the length portion a as well as over the entire height of head 21. Preferably, the depth of recess 25 is constant over the entirety of portion a. Alternatively, the depth of recess 25 need not be constant and can, instead, have regular or irregular variations in its depth.

According to the preferred embodiment of the invention shown in FIGS. 1–6, the weakened cross section is formed, in association with external recess 25, by at least one further recess, or groove, 26 formed at the internal periphery of seal member 20 opposite external recess 25. Internal recess 26 is preferably disposed opposite of the center of external recess 25. According to a particularly advantageous embodiment of a seal member having lips, as illustrated in the application drawing, the safety device is provided with two internal grooves 26 which extend in from a respective internal edge 27 of each of lips 22 and 23, substantially in line with the center or median part of external recess 25.

Advantageously, each recess 26 has a semi-circular outline and is arranged in a respective one of lips 22 and 23 in a manner such that recesses 26 are arranged in line with one another in a direction perpendicular to the plane of FIGS. 3 and 4. According to a modified form of construction, recesses 26 need not be located in line with the median part of external recess 25 as long as they are located opposite recess 25. Internal recesses 26 can also have forms other than those shown in FIGS. 3 and 4 and, for example, can be oval, rectangular, etc.

Obviously, seal member 20 can comprise at its periphery several length portions a each having a reduced cross section and each having an external recess 25 in association with one or a plurality of internal recesses 26. According to a particularly advantageous embodiment of the invention, seal member 20 has twelve such length portions having a reduced cross section. These twelve length portions are spaced regularly around the periphery, or circumference, of seal member 20. The number of portions of reduced cross section can be greater than or less than twelve.

The function of a safety device according to the invention is as follows.

During normal operation, seal member 20 assures a hermetic seal between pot 2 and lid 5. A normal sealing position of the seal member is shown in FIGS. 1 and 3. In this position, head 21 of seal member 20 bears against peripheral skirt 7, upper lip 22 is applied against the interior face of lid 5 and lower lip 23 is applied against edge 3 under the action of the internal pressure P. In normal operation, the pressure contained at the interior of the pressure cooker is stabilized by a conventional pressure regulation device (not shown).

In the case of a malfunction in the operation of the conventional pressure regulation device, the pressure at the interior of the pressure cooker can increase. Starting from an assigned critical value, seal member 20 deforms locally, as shown in FIG. 4, in the vicinity of the length portion a which has a reduced cross section. The internal face of external recess 25 in combination with the or each recess 26 deforms locally in a radially outward direction in order to form a curved part. The local deformation of seal member 20 permits the release in a progressive manner of excess steam while assuring a gap in the seal between seal member 20 and pot 2, and in particular between recess 26 at lower lip 23 and folded over edge 3 (FIGS. 2 and 4). The creation of a localized weakened, or reduced cross section, zone on seal member 20 avoids the need to impart any particular form to the outline of lid 5, while permitting mastery of the placement of the location where a gap will appear in the seal member upon the occurrence of an excess pressure. The presence of recesses 26 improves the progressivity of the deformation of seal member 20 which permits a progressive liberation of the excess vapor, thus providing a reduction in the traumatizing effects associated with the noise and projections of excess steam, while assuring the stability of the apparatus.

The deformation experienced by seal member 20 in the length region a is comparable to a creep movement and mastery of the progressivity of this movement of seal member 20 also permits avoiding all risk of extinction of a gas fire which is being used to heat the container.

This application relates to subject matter disclosed in French Application number 93 06727, filed on May 27, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. Safety device for automatically limiting the pressure in a container, which container is composed of a pot and a lid, said device comprising a seal member interposed between the pot and the lid to form a seal between the pot and the lid, said seal member having a length, an interior surface and an exterior surface and being provided with a recess in said exterior surface along a portion of said length, said recess creating a reduced cross section of said seal member for permitting a deformation of said portion under the action of pressure in the container, starting from a predetermined pressure value, to assure a break in the seal between the pot and the lid and depressurization of the container, wherein the reduced cross section is formed by a combination of said recess in said exterior surface and at least one recess in said interior surface along a portion of said length of said seal member.

2. A pressure container comprising: a pot; a lid arranged to be attached to the pot in order to close the container; and a safety device as defined in claim 1 interposed between said pot and said lid.

3. Safety device as defined in claim 1 wherein said seal member is in the form of a member having two lips.

4. A pressure container comprising: a pot; a lid arranged to be attached to the pot in order to close the container; and a safety device as defined in claim 3 interposed between said pot and said lid.

5. Safety device according to claim 3 wherein said seal member has a periphery and is provided with a plurality of length portions distributed around the periphery, with each length portion having a reduced cross section.

6. Safety device according to claim 5 wherein the number of said plurality of length portions is twelve and said length portions are distributed regularly around said seal member.

7. A pressure container comprising: a pot; a lid arranged to be attached to the pot in order to close the container; and a safety device as defined in claim 6 interposed between said pot and said lid.

8. Safety device as defined in claim 3 wherein said recess and said exterior surface is formed at an external face of said seal member and said at least one recess in said interior surface comprises two recesses each located in a respective one of said lips and opposite said recess in said exterior surface, said recesses in said interior surface being located in line with one another.

9. A pressure container comprising: a pot; a lid arranged to be attached to the pot in order to close the container; and a safety device as defined in claim 8 interposed between said pot and said lid.

10. Safety device according to claim 8 wherein said seal member has a periphery and is provided with a plurality of length portions distributed around the periphery, with each length portion having a respective region of reduced cross section created by a respective recess in said exterior surface and a respective recess in said interior surface.

11. A pressure container comprising: a pot; a lid arranged to be attached to the pot in order to close the container; and a safety device as defined in claim 10 interposed between said pot and said lid.

12. Safety device according to claim 10 wherein the number of said plurality of length portions is twelve and said length portions are distributed regularly around said seal member.

13. A pressure container comprising: a pot; a lid arranged to be attached to the pot in order to close the container; and a safety device as defined in claim 12 interposed between said pot and said lid.

14. Safety device for automatically limiting the pressure in a container, which container is composed of a pot and a lid, said device comprising a seal member interposed between the pot and the lid to form a seal between the pot and the lid, said seal member having a length, an interior surface and an exterior surface and being provided with a recess in said exterior surface along a portion of said length, said recess creating a reduced cross section of said seal member for permitting a deformation of said portion under the action of pressure in the container, starting from a predetermined pressure value, to assure a break in the seal between the pot and the lid and depressurization of the container, wherein the reduced cross section is formed by a combination of said recess in said exterior surface and at least one recess in said interior surface, and wherein said seal member has a periphery and is provided with a plurality of length portions distributed around the periphery, with each length portion having a respective region of reduced cross section created by a respective recess in said exterior surface and a respective recess in said interior surface.

15. Safety device according to claim 14 wherein the number of said plurality of length portions is twelve and said length portions are distributed regularly around said seal member.

16. A pressure container comprising: a pot; a lid arranged to be attached to the pot in order to close the container; and a safety device as defined in claim 15 interposed between said pot and said lid.

17. Safety device for automatically limiting the pressure in a container, which container is composed of a pot and a lid, said device comprising a seal member interposed between the pot and the lid to form a seal between the pot and the lid, said seal member having a length, an interior surface and an exterior surface and being provided with an external recess in said exterior surface along a portion of said length and with an internal recess in said interior surface along a portion of said length, said internal recess and external recess together creating a reduced cross section of said seal member for permitting a deformation of said seal member at the location of the reduced cross section under the action of pressure in the container, starting from a predetermined pressure value, to assure a break in the seal between the pot and the lid and depressurization of the container.

18. Safety device according to claim 17 wherein said internal recess is disposed along the same portion of the length of said seal member as said external recess.

* * * * *